US012384555B2

(12) United States Patent
Fukuchi et al.

(10) Patent No.: US 12,384,555 B2
(45) Date of Patent: Aug. 12, 2025

(54) AIRCRAFT COMPRISING A CONTROL UNIT TO RUN AT LEAST ONE OF ROTATIONAL APPARATUS OR CONTROL APPARATUS BASED ON TEMPERATURE

(71) Applicant: HONDA MOTOR CO., LTD., Tokyo (JP)

(72) Inventors: Yuichi Fukuchi, Saitama (JP); Toshinori Tsukamoto, Saitama (JP); Azuki Ichikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 18/066,997

(22) Filed: Dec. 15, 2022

(65) Prior Publication Data

US 2023/0202653 A1     Jun. 29, 2023

(30) Foreign Application Priority Data

Dec. 28, 2021   (JP) ................. 2021-215050

(51) Int. Cl.
  *B64D 33/10*  (2006.01)
  *B64C 11/30*  (2006.01)
  *B64C 29/00*  (2006.01)
  *B64D 27/34*  (2024.01)
  *H02K 9/00*   (2006.01)

(52) U.S. Cl.
  CPC ............ *B64D 33/10* (2013.01); *B64C 11/305* (2013.01); *B64D 27/34* (2024.01); *H02K 9/00* (2013.01); *B64C 29/0025* (2013.01)

(58) Field of Classification Search
  CPC .......... B64D 27/34; B64D 33/10; H02K 9/00; B64C 11/305; B64C 29/0025
  See application file for complete search history.

(56) References Cited

U.S. PATENT DOCUMENTS 6,293,491 B1   9/2001   Wobben
9,120,560 B1   9/2015   Armer
(Continued)

FOREIGN PATENT DOCUMENTS

DE   102016125656 A1   6/2018
JP      2013532601 A   8/2013
(Continued)

OTHER PUBLICATIONS

Office Action issued for counterpart Japanese Application No. 2021-215050, transmitted from the Japanese Patent Office on Jul. 2, 2024 (drafted on Jun. 28, 2024).

*Primary Examiner* — Joshua D Huson
*Assistant Examiner* — Peter A Taraschi

(57) ABSTRACT

Freezing of an electrical component of a VTOL rotor is prevented. The aircraft 100 includes a fuselage 12, a VTOL rotor 20 including one or more blades 23 that is supported on the boom 18 to be spaced apart from the fuselage for generating thrust in a vertical direction during take-off and landing, a motor 21 that is stored in the boom and is configured to cause the one or more blades to rotate, and an inverter 22 for controlling the motor, a detection unit 80 configured to detect a temperature of at least one apparatus of the motor or the inverter, and a control unit 99 configured to run the at least one apparatus based on a thrust request for a plurality of VTOL rotors and a detection result of the temperature.

23 Claims, 8 Drawing Sheets

(56) References Cited

U.S. PATENT DOCUMENTS

| | | |
|---|---|---|
| 9,415,878 B2 | 8/2016 | Wetzel |
| 9,586,690 B2 | 3/2017 | Rajashekara |
| 9,845,150 B2 | 12/2017 | Kroo |
| 9,932,108 B1 | 4/2018 | Viele |
| 10,029,785 B2 | 7/2018 | Niedzballa |
| 10,081,436 B1 | 9/2018 | Tian |
| 10,131,426 B2 | 11/2018 | Judas |
| 10,350,960 B1 | 7/2019 | Long |
| 10,358,230 B2 | 7/2019 | Sahu |
| 10,472,064 B2 | 11/2019 | Tian |
| 10,577,091 B2 | 3/2020 | Parks |
| 10,836,485 B2 | 11/2020 | Welsh |
| 2013/0020429 A1 | 1/2013 | Kroo |
| 2015/0232191 A1 | 8/2015 | Wetzel |
| 2015/0367950 A1 | 12/2015 | Rajashekara |
| 2016/0207625 A1 | 7/2016 | Judas |
| 2016/0236774 A1 | 8/2016 | Niedzballa |
| 2017/0081040 A1 | 3/2017 | Pal |
| 2018/0072431 A1 | 3/2018 | Sahu |
| 2018/0093770 A1 | 4/2018 | Welsh |
| 2018/0170553 A1 | 6/2018 | Wang |
| 2018/0305005 A1 | 10/2018 | Parks |
| 2019/0047342 A1 | 2/2019 | Dietrich |
| 2019/0127056 A1 | 5/2019 | Weekes |
| 2019/0233107 A1 | 8/2019 | Tian |
| 2019/0277183 A1* | 9/2019 | Bauer .................. F16K 31/1221 |
| 2019/0323429 A1* | 10/2019 | McGee .................... F02C 7/25 |
| 2019/0337613 A1 | 11/2019 | Villa |
| 2020/0031478 A1 | 1/2020 | Clark |
| 2020/0115045 A1 | 4/2020 | Mermoz |
| 2020/0269975 A1* | 8/2020 | Fink .................... B64C 29/0033 |
| 2020/0388865 A1* | 12/2020 | Rainville ............... B64D 41/00 |
| 2021/0061478 A1 | 3/2021 | Hirabayashi |
| 2021/0062672 A1* | 3/2021 | Liu ..................... H02K 7/1823 |
| 2021/0114742 A1* | 4/2021 | Casado-Montero ........................ F28D 1/05316 |
| 2023/0105466 A1* | 4/2023 | Eleryan ................. B64D 27/24 701/3 |
| 2023/0234731 A1 | 7/2023 | Tanaka |

FOREIGN PATENT DOCUMENTS

| | | |
|---|---|---|
| JP | 5676824 B2 | 2/2015 |
| JP | 2017081040 A | 5/2017 |
| JP | 6469488 B2 | 2/2019 |
| JP | 2020515031 A | 5/2020 |
| JP | 2020131781 A | 8/2020 |
| JP | 2021024433 A | 2/2021 |
| JP | 2021030960 A | 3/2021 |
| JP | 2021031007 A | 3/2021 |
| WO | 2021241041 A1 | 12/2021 |

* cited by examiner

AIRCRAFT COMPRISING A CONTROL UNIT TO RUN AT LEAST ONE OF ROTATIONAL APPARATUS OR CONTROL APPARATUS BASED ON TEMPERATURE

CROSS-REFERENCE TO RELATED APPLICATIONS

The contents of the following Japanese patent application(s) are incorporated herein by reference:
NO. 2021-215050 filed in JP on Dec. 28, 2021

BACKGROUND

1. Technical Field

The present invention relates to an aircraft and a method.

2. Related Art

Conventionally, a vertical take-off and landing type aircraft (also called a vertical take-off and landing aircraft or simply an aircraft) is known which performs take-off and landing by elevating and lowering in a vertical direction with rotors for vertical take-off and landing (VTOL) arranged on the right side and the left side of the fuselage, and flies in a horizontal direction with a cruising rotor arranged on the back portion of the fuselage. Here, in Patent Document 1, it is described that a chamber for storing a rotor element and a heating apparatus for heating the chamber is provided in order to prevent freezing of the rotor element of the VTOL rotor due to low temperature during winter or low temperature accompanied by cruising altitude. However, addition of the heating apparatus is required and a backup for a case where the heating apparatus experiences a failure.

Patent Document 1: U.S. Patent Application Publication No. 2020/0031478

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
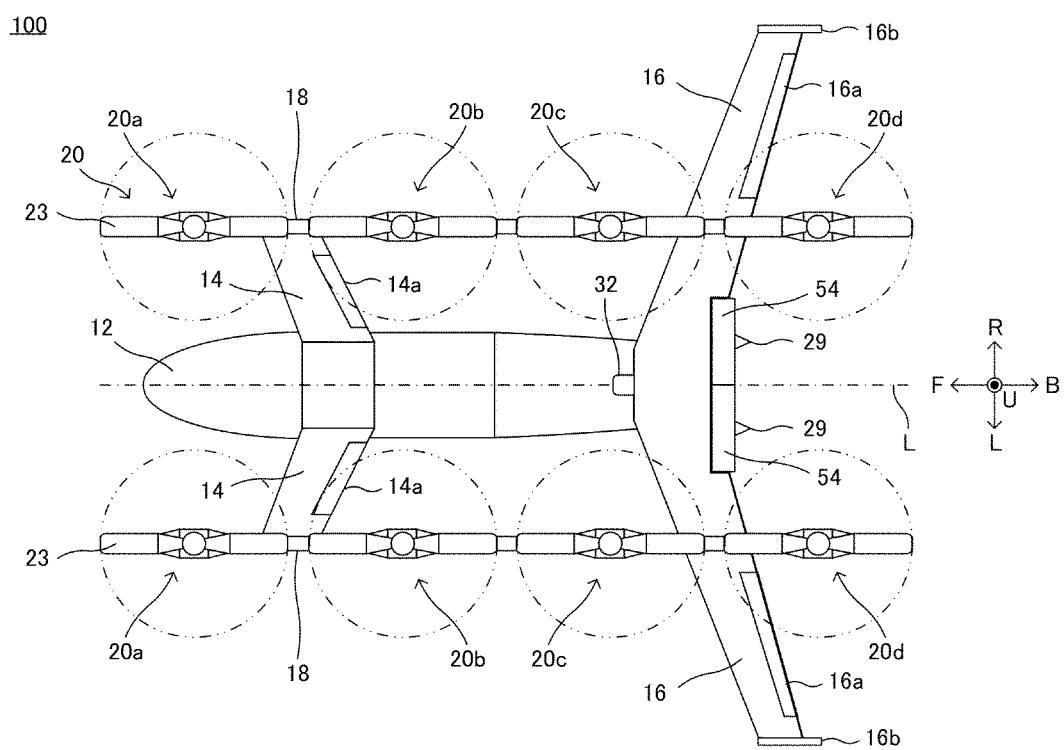
FIG. 1 illustrates a configuration of an aircraft according to the present embodiment in a top view.

FIG. 1 illustrates a configuration of an aircraft 100 according to the present embodiment in a top view. The aircraft 100 includes a rotor having an electric motor as its driving source, is a vertical take-off and landing aircraft that performs take-off and landing in a vertical direction by using rotors for vertical take-off and landing (VTOL) to generate thrust, as well as flies in a horizontal direction by using a cruising rotor (also called a cruise rotor) to generate thrust, and is a hybrid aircraft that is capable of operating an electric motor with electric power supplied from each of a battery and a motor generator while charging the battery with the motor generator. The aircraft 100 according to the present embodiment is configured to allow prevention of freezing of the electrical components of the VTOL rotor, in particular, without adding a heating apparatus, and includes a fuselage 12, a front wing 14, a rear wing 16, two booms 18, eight VTOL rotors 20, two cruising rotors 29, a cooling system 60, a detection unit 80, a heat generation unit 90, and a control unit 99.

The fuselage 12 is a structure body for providing space for crews and passengers to board and to load cargo or the like, and for storing apparatuses such as the battery or the motor generator (neither are shown). The fuselage 12 is symmetric relative to a central axis L, and has a shape that extends in a front-back direction that is parallel to the central axis L and is thin in the left-right direction that is orthogonal to the central axis L in the horizontal plane. Here, the direction parallel to the central axis L is defined as the front-back direction, in which the left side of the drawing and the right side of the drawing are respectively the front (F) and back (B), and the direction orthogonal to the central axis L in the horizontal plane is defined as the width direction (or the left-right direction), in which the upper side of the drawing and the lower side of the drawing are respectively the right (R) and left (L). In addition, the vertical direction is orthogonal to each of these front-back direction and the width direction, in which the upward and downward in the vertical direction are also respectively referred to as upper (U) and lower (L). The fuselage 12 has a front end with a round curvature in a top view, and a rear end parallel to the width direction that is tapered to some extent relative to the barrel portion.

The front wing 14 is a wing body provided to extend laterally from the fuselage 12, and configured to generate lift during cruise, that is, by moving forward, which functions as a canard of the aircraft 100. The front wing 14 has a V-shape with two wing bodies respectively extending from the center portion to the front-left direction and the front-right direction, and is fixed on the upper portion of the front side of the barrel portion of the fuselage 12 at the center portion with the opening of the V-shaping facing toward the front. The front wing 14 includes an elevator 14a arranged on rear edge in each of the two wing bodies.

The rear wing 16 is a wing body provided to extend laterally from the fuselage 12, and configured to generate lift during cruise, that is, by moving forward, which functions as a swept-back wing configured to reduce air resistance. The rear wing 16 has a V-shape with two wing bodies respectively extending from the center portion to the rear-left direction and the rear-right direction, and is fixed on the upper portion of the rear end of the fuselage 12 at the center portion with the opening of the V-shaping facing toward the back via a pylon 32. The rear wing 16 includes an elevon 16a arranged on the rear edge in each of the two wing bodies, and a vertical tail 16b arranged on a wing end.

Here, the wing area of the rear wing 16 is greater than that of the front wing 14, and the wing width of the rear wing 16 is wider than that of the front wing. In this manner, the lift generated by the rear wing 16 by moving forward is greater than the lift generated by the front wing 14, and the rear wing 16 functions as the main wing of the aircraft 100. Note that, the wing areas, the lengths or the like of the front wing 14 and the rear wing 16 may be defined based on the balance of the lift generated by each wing, the center of gravity, the posture of the aircraft body during cruise, and the like.

The two booms 18 are structure bodies that are supported by the front wing 14 and the rear wing 16 to be spaced apart from the fuselage 12 to the left and to the right, respectively, and functions to support or store each units in the configuration of the VTOL rotor 20 and the cooling system 60 described below. The two booms 18 each have a cylindrical shape extending in a front-back direction in a top view and wing-shaped cross section with the upper side having a round curvature and the lower side tapered in a front view, and are paired to be arranged symmetrically with respect to the fuselage 12 (that is, the central axis L). Note that, the two booms 18 may be formed to extend in the front-back direction and have an arch-shape curvature in the width direction. The two booms 18 have their front side end portions positioned forward of the front wing 14 to be supported by the ends of the front wing 14 at the front side barrel portion (between the two VTOL rotors 20a, 20b on the front side), and have their rear side end portions positioned behind the rear wing 16 to be supported by the rear wing 16 at the rear side barrel portion (between the two VTOL rotors 20c, 20d on the rear side).

Figure 2A:
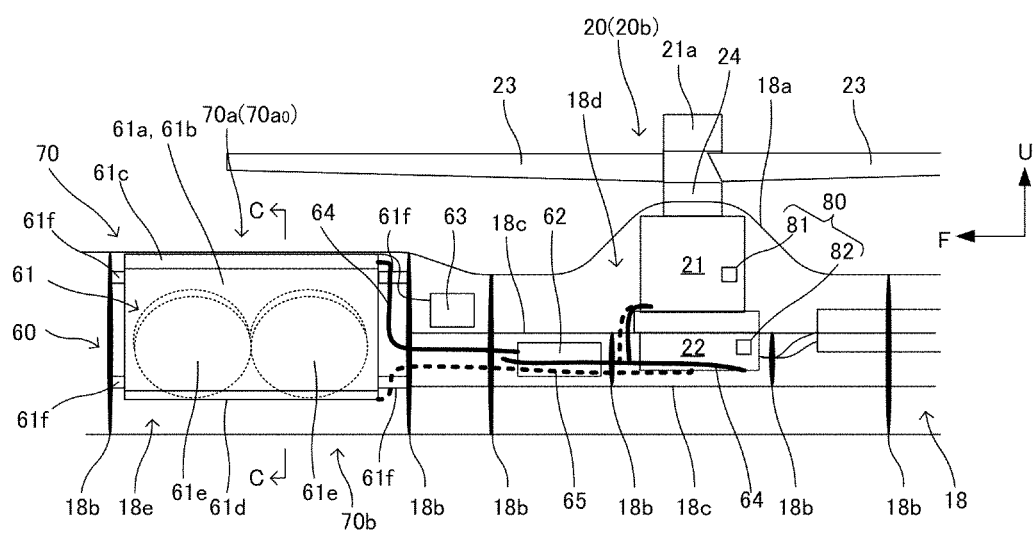
FIG. 2A illustrates an internal configuration of a boom.

FIG. 2A illustrates an internal configuration of the boom 18. The boom 18 includes a skin 18a, a rib 18b, and a spar 18c. The skin 18a is a member that constitutes the surface of the boom 18, and is molded into a cylindrical shape having a wing-shaped cross section and extending in the front-back direction. The skin 18a rises high above where the VTOL rotor 20 is arranged and spreads in the left-right direction to form a space 18d, and rises to some extent above where the cooling system 60 is arranged and spreads in the left-right direction to form a space 18e. Note that, the skin 18a is molded to include an inlet 70a for taking in airflow and an outlet 70b for discharging airflow respectively on the upper side and the lower side of the location where the cooling system 60 is arranged. In addition, a shutter $70a_0$ for closing the inlet 70a may be included. The rib 18b is a wing-shaped plate member, and is arranged in a plurality of locations in the front-back direction to retain the skin 18a from the inside. Note that, the spaces 18d, 18e within the boom 18 are partitioned by the rib 18b. The spar 18c is a bar member that extends in the front-back direction, and constitutes a backbone for supporting the rib 18b and other members.

The eight VTOL rotors 20 (20a to 20d) are rotors that are supported by the two booms 18 to generate thrust in the vertical direction during take-off and landing. Four VTOL rotors 20a to 20d among the eight VTOL rotors 20 are supported at a substantially equal interval by the boom 18 on the left-hand side, and the remaining four VTOL rotors 20a to 20d are supported at a substantially equal interval by the boom 18 on the right-hand side. Here, the VTOL rotor 20a is arranged frontmost, the two VTOL rotors 20b, 20c are arranged to be front and back, respectively, between the front wing 14 and the rear wing 16, and the VTOL rotor 20d is arranged last. Among the VTOL rotors 20a to 20d on the left-hand side and the four VTOL rotors 20a to 20d n the right-hand side, each two VTOL rotors 20a to 20d which are located at the same position relative to the front-back direction form a pair, and are controlled to rotate in reverse directions from each other. Unless stated otherwise, each of the eight VTOL rotors 20a to 20d is referred to simply as the VTOL rotor 20.

The VTOL rotor 20 includes one or more blades 23, a motor 21, an inverter 22, a variable pitch mechanism 24, and an ECU 25. Note that, the motor 21 and the inverter 22 are also called the electrical components.

The one or more blades 23 are supported on the boom 18 as illustrated in FIG. 2A, and are vane-shaped members that generate thrust in the vertical direction by rotation thereof. In the present embodiment, the number of the blades 23 is two, but it may be any number including one or three or more. The one or more blades 23 are supported at a position higher than the front wing 14 and the rear wing 16. Note that, in FIG. 1, the plane of rotation of the one or more blades 23 of each VTOL rotor 20 is illustrated by using two-dotted lines.

The motor (an example of a rotational apparatus) 21 is an electric motor that includes a rotational axis 21a toward the up-down direction and causes the blade 23 fixed to the motor 21 to rotate via a transmission (not shown) for converting the rotation number of the rotational axis 21a. The motor 21 is supported by the spar 18c via a support member to be accommodated in the space 18d of the boom 18.

The inverter (an example of the control apparatus) 22 is an apparatus that receives DC power supply from the battery via a high-voltage system (also called a power distribution system (PDS)), and converts DC power to AC power by driving (turning on and off) the switching device according to a driving signal received from the ECU 25 described below to supply the same to the motor 21, and is supported below the motor 21 by the spar 18c. The inverter 22 can control the rotational torque and the rotation speed of the motor 21 respectively by increasing and decreasing the amplitude and frequency of the AC power.

The variable pitch mechanism 24 is a mechanism for changing the angle (that is, the pitch) with respect to the plane of rotation of each of the one or more blades 23. The variable pitch mechanism 24 includes an actuator 24a that causes the base end of the one or more blades 23 to rotate. The thrust generated by rotation of the one or more blades 23 of the VTOL rotor 20 can be controlled by receiving a low-voltage DC power from the battery via a low-voltage system (also called a low-voltage system (LVS)), and then running the actuator 24a to adjust the pitch of the one or more blades 23, for example, enhance the thrust by increasing the pitch and reducing the thrust by decreasing the pitch.

The ECU (electronic control unit) 25 is an apparatus that is run by receiving a low-voltage DC power from the battery via a low-voltage system, which controls the operation of the inverter 22 by sending a driving signal thereto, and modulates the amplitude and frequency of the AC power. The ECU 25 is implemented by a microcontroller, as an example.

The two cruising rotors 29 are rotors that are supported by the rear end of the fuselage 12 to generate thrust during cruise. The cruising rotors 29 are arranged side by side on the left and right to the central axis L in a cylindrical duct 54 fixed to the rear end of the fuselage 12, and have one or more blades that are supported in the duct 54 to generate a forward thrust by rotation thereof, motors that have rotational axes toward the front-back direction, via which the one or more blades fixed to the end are caused to rotate, and inverters that receive DC power supply from the battery and converts it to AC power to supply it to the motor (neither are shown). The inverter can control the rotation speed of the motor.

The cooling system (an example of the cooling apparatus) 60 is a system for cooling the motor 21 and the inverter 22 (which are called electrical components) that constitutes the VTOL rotor 20 in a liquid cooling manner by using the radiator 61 arranged within the boom 18. Although, in the present embodiment, one cooling system 60 is provided for one VTOL rotor 20, making a total of eight cooling systems 60, it is not limited thereto, and one cooling system 60 may be provided for a plurality of (for example, two) VTOL rotors 20. The cooling system 60 includes a radiator 61, a pump 62, a coolant fluid tank 63, tubes 64, 65, and a temperature sensor 66. Note that, water can be used as the coolant fluid.

Figure 2B:
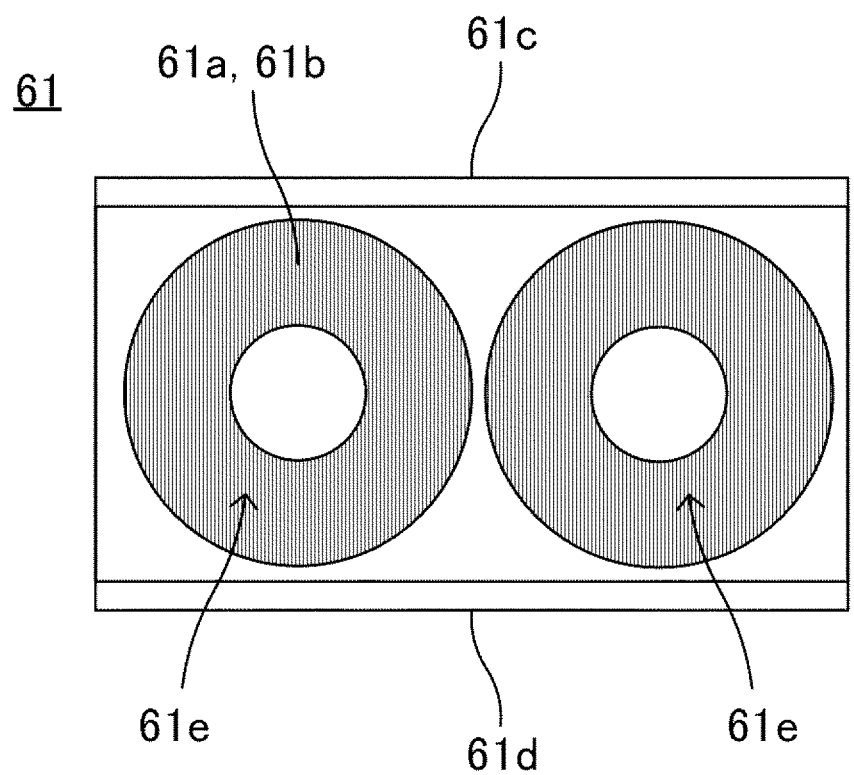
FIG. 2B illustrates a configuration of a radiator in a front view.
Figure 2C:
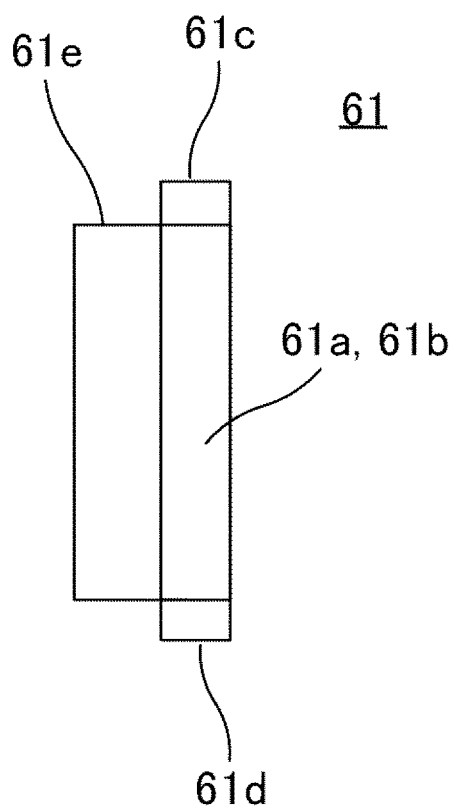
FIG. 2C illustrates the configuration of the radiator in a side view.

FIG. 2B and FIG. 2C illustrate configurations of the radiator 61 in a front view and a side view, respectively. The radiator 61 is a heat exchanger for cooling the coolant fluid to cool the motor 21 and the inverter 22. Note that, the radiator 61 is supported between two ribs 18b by using the support member 61f, and is stored within the boom 18. The radiator 61 includes a plurality of tubes 61a for causing the coolant fluid to flow upward and downward, a plurality of fins 61b fixed to each of the plurality of tubes 61a to increase the surface area that the airflow contacts, an upper tank 61c for sending the coolant fluid to the plurality of tubes 61a, a lower tank 61d for receiving the coolant fluid from the plurality of tubes 61a, and two fans 61e for sending the airflow to the plurality of fins 61b.

The plurality of tubes 61a are arranged in a horizontal direction, assembled in a rectangular shape in the front view with the plurality of fins 61b, and constitutes the radiator main body with the upper tank 61c fixed on the upper side thereof and the lower tank 61d fixed on the lower side thereof. Operation of the pump 62 described below causes the coolant fluid having been heated by circling through the motor 21 and the inverter 22 to be fed to the upper tank 61c via the tube 64, to be cooled by flowing downward through each of the plurality of tubes 61a and sent to the lower tank 61d, and to be sent to the motor 21 and the inverter 22 via the tube 65. At this time, the two fans 61e operate to take in the airflow from the inlet 70a provided on the upper side of the boom 18 and to feed the airflow from one side (right-hand side in FIG. 2C) of the radiator main body so as to contact the plurality of fins 61b, thereby causing heat exchange between the airflow and the radiator main body. The heated airflow is leaked from the other side (left-hand side in FIG. 2C) of the radiator main body, and discharged from the outlet 70b provided on the lower side of the boom 18.

The pump 62 is connected to the radiator 61 via the tube 65, and receives the coolant fluid that is cooled therefrom, and feeds the same to the motor 21 and the inverter 22. In accordance with this, the coolant fluid having been heated through the motor 21 and the inverter 22 is fed to the radiator 61 via the tube 64.

The coolant fluid tank 63 is a container for storing the coolant fluid. For example, in a case where there is a shortage of the coolant fluid, the coolant fluid is sent from the coolant fluid tank 63 to the cooling circuit to supplement the coolant fluid.

The tubes 64, 65 are members for transporting the coolant fluid, and connects the radiator 61 and the pump 62 to the motor 21 and the inverter 22 to constitute a cooling circuit through which the coolant fluid circles.

The temperature sensor 66 (see FIG. 3) is a sensor for detecting a temperature of the coolant fluid that flows through the tubes 64, 65 and/or the pump 62. Any type of temperature sensors can be employed as the temperature sensor 66, such as a temperature resistor (thermistor), a thermocouple, for example, as long as the temperature of the coolant fluid and/or the pump 62 when the cooling system 60 (radiator 61) is running and when it is stopped can be detected within a temperature range (for example, −70 to 100° C.). Detecting the temperature of the coolant fluid and/or the pump 62 by using the temperature sensor 66 enables the heat generation unit 90 described below to be run to cause heat generation of the electrical components of the VTOL rotor 20 when the coolant fluid is at a low temperature, thereby heating the coolant fluid to prevent freezing thereof.

Figure 2D:
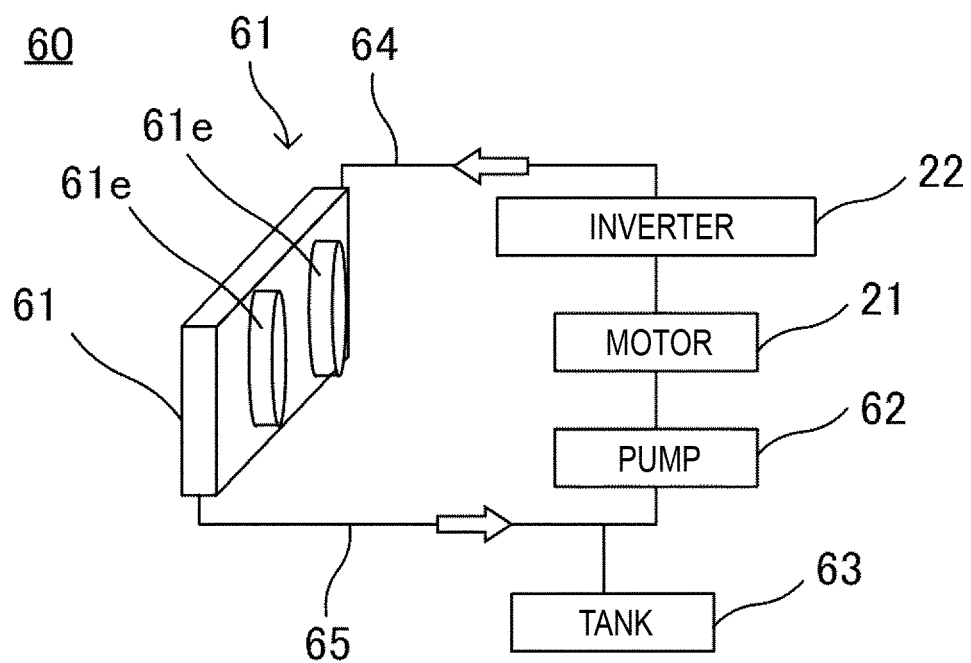
FIG. 2D illustrates a circuit configuration of a cooling system.

FIG. 2D illustrates a circuit configuration of a cooling system. The upper tank 61c of the radiator 61 is connected to the motor 21 and the inverter 22 by the tube 64. The lower tank 61d of the radiator 61 is connected to the motor 21 and the inverter 22 via the pump 62 by the tube 65. The coolant fluid tank 63 is connected to the tube 65. The operation of the pump 62 causes the coolant fluid heated in the motor 21 and the inverter 22 to be sent to the radiator 61 via the tube 64, and the coolant fluid cooled at the radiator 61 is sent to the motor 21 and the inverter 22 via the tube 65.

Note that, in the cooling circuit provided by the cooling system 60, the motor 21 and the inverter 22 are connected in series downstream of the pump 62, but they may alternatively be connected in parallel. In addition, other electrical components may be connected to the motor 21 and the inverter 22 in series or in parallel.

Note that, a cooling system having a configuration similar to that of the cooling system 60 may be provided to cool the electrical components of the cruising rotor 29.

The detection unit 80 is a unit for detecting the temperature of electrical components of the eight VTOL rotors 20 (20a to 20d), an includes, in particular, the temperature sensors 81, 82 provided at each of the motors 21 and the inverters 22 of the eight VTOL rotors 20. Any type of temperature sensors can be employed as the temperature sensor 81, 82, such as a temperature resistor (thermistor), a thermocouple, for example, as long as the temperature when the motor 21 and the inverter 22 are running and when they are stopped can be detected within a temperature range (for example, −70 to 300° C.).

The heat generation unit 90 is a unit for controlling the electrical components of the VTOL rotor 20 to generate heat. In the present embodiment, in particular, the electrical components can be caused to generate heat when overcooled, to prevent freezing thereof. In addition, freezing of the coolant fluid of the radiator 61 can also be prevented. The heat generation unit 90 can be configured to include the ECU 25 and the variable pitch mechanism 24 described above.

By being controlled by the control unit 99 described below to send a driving signal to the inverter 22, the ECU 25 increases and decreases the rotation number of the motor 21 by increasing and decreasing the frequency of the AC power applied to a three-phase coil of the motor 21, and increases and decreases the rotational torque of the motor 21 by increasing and decreasing the amplitude (that is, the voltage amplitude) of the AC power applied to the three-phase coil of the motor 21. By running the motor 21 with increased and decreased power (which is equal to the product of the rotation number and the rotational torque) by one or both of the above, it is possible to generate an amount of heat that corresponds to the power of the motor 21.

In addition, the ECU 25 is controlled by the control unit 99 described below to cause the inverter 22 to generate heat by increasing the current amount that flows through the switching device of the inverter 22 to increase power loss. Note that, the current amount that flows through the switching device may be directly controlled by the control unit 99. Alternatively or additionally, the ECU 25 controls driving timing of the switching device, and modulates the phase of the AC power applied to the three-phase coil of the motor 21 to lower the DC and AC power conversion efficiency, thereby causing power loss of the inverter 22 to increase and to cause heat generation thereof. Here, the power conversion efficiency can be increased by setting the phase difference between UVW phases to 120 degrees, and can be lowered by offsetting the phase difference of at least one phase among the UVW phases with respect to the other phases from 120 degrees.

The variable pitch mechanism 24 is controlled by the control unit 99 described below to drive the actuator 24a such that required thrust can be achieved by the VTOL rotor 20, that is, by rotation of the one or more blades 23 and adjusts the pitches thereof when the rotation number of the motor 21 is increased or decreased by the ECU 25. For example, when the thrust generated by the VTOL rotor 20 exceeds the required thrust (thrust request) due to increase in the rotation number to cause the motor 21 to generate heat during cruise, the pitch of the one or more blades 23 is reduced (to be closer to the plane of rotation) by the variable pitch mechanism 24, thereby suppressing the thrust. In addition, when the thrust generated by the VTOL rotor 20 does not meet the thrust request even with increase in the rotation number of the motor 21, or when the thrust generated by the VTOL rotor 20 is below the thrust request due to increase in the thrust request to cause the aircraft 100 to ascend, the pitch of the one or more blades 23 is increased (to be away from the plane of rotation) by the variable pitch mechanism 24, thereby increasing the thrust. As such, the pitch of the blade 23 is optimized with respect to the rotation number of the motor such that the thrust generated by the VTOL rotor 20 satisfies the thrust request.

Figure 3:
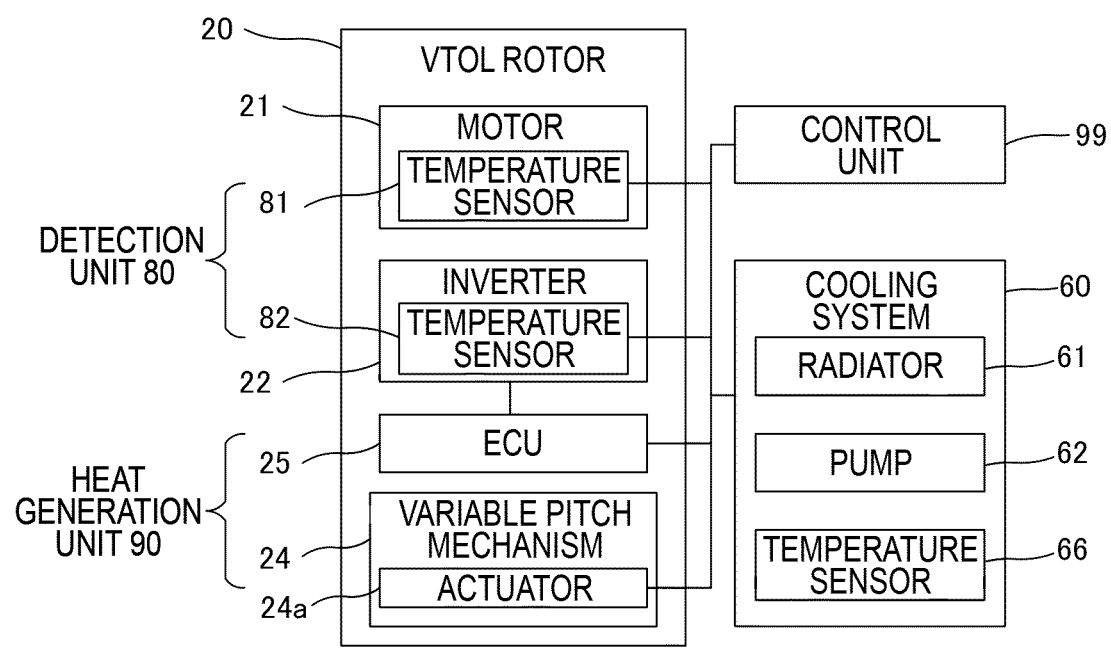
FIG. 3 illustrates a configuration of a control system for a heat generation unit for causing heat generation of the electrical components of a VTOL rotor and a cooling system for cooling thereof.

FIG. 3 illustrates a configuration of a control system for the heat generation unit 90 for causing the electrical components of a VTOL rotor 20 to generate heat and a cooling system 60 for cooling the electrical components of a VTOL rotor 20. Note that, although only one VTOL rotor 20 representing the eight VTOL rotors 20 and one cooling system 60 provided for that VTOL rotor 20 are illustrated for convenience, the control unit 99 performs control similarly for the other VTOL rotors 20 and the cooling systems 60 provided therefor.

The control unit 99 is a unit for controlling running of the motors 21 and the inverters 22 of the eight VTOL rotors 20 and the cooling system 60 (the radiator 61), and can be implemented by a computer apparatus that achieves a control function by activating a control program. The control unit 99 includes an interface 99a such as a control stick, thrust lever, or the like for receiving operational signals by a pilot of the aircraft 100, such as a signal related to steering of the aircraft, a thrust request for the VTOL rotor 20, a thrust request for the cruising rotor 29, for example.

The control unit 99 runs the motor 21 and/or the inverter 22 via the ECU 25 to cause heat generation thereof, based on the thrust request for the VTOL rotor 20 inputted via the interface 99a and a detection result of the temperature of the motor 21 and the inverter 22 detected by the detection unit 80. In addition, the control unit 99 may further stop the cooling system 60 based on the detection result of the temperature of the motor 21 and the inverter 22 detected by the detection unit 80, and stop cooling of the motor 21 and the inverter 22. Here, the control unit 99 may stop the radiator 61 or the pump 62 included in the cooling system 60 or both, or may stop the cooling function by closing, with the shutter 70a₀, the inlet 70a provided on the upper side of the boom 18 for introducing airflow to the radiator 61. In this manner, over-cooling of the motor 21 and the inverter 22 can be prevented.

Note that, the control unit 99 may operate by switching the heat generation unit 90 and the cooling system 60 during vertical take-off and landing and during cruise. For example, the cooling system 60 may be run when running the VTOL rotor 20, and the motor 21 and the inverter 22 of the VTOL rotor 20 may be run via the heat generation unit 90 to cause heat generation thereof when the cruising rotor 29 is running, such as during cruise.

Figure 4:
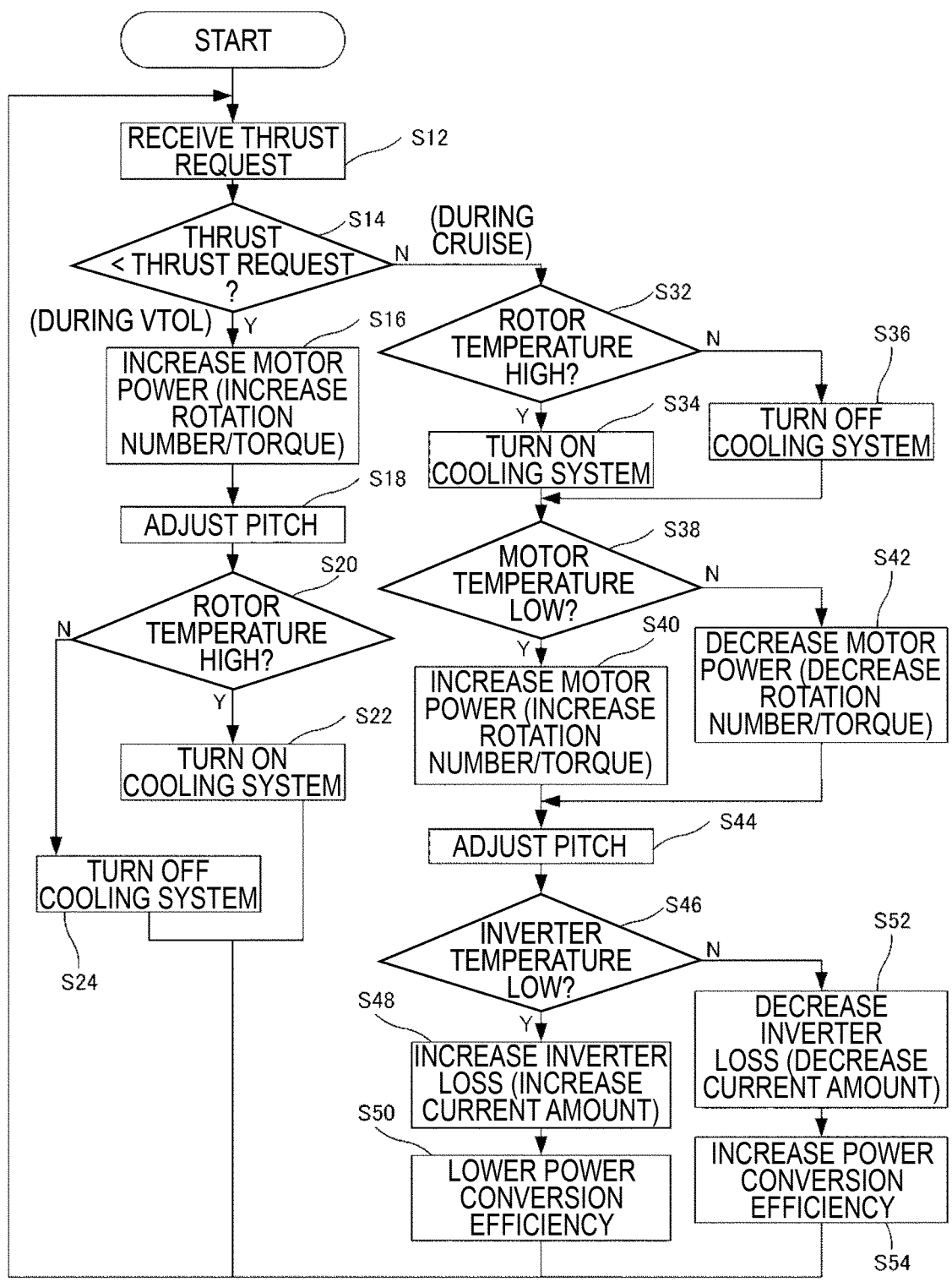
FIG. 4 illustrates a flow of a heat generation and cooling method of the electrical components of the VTOL rotor.

FIG. 4 illustrates a flow S100 of a heat generation and cooling method of the electrical components of the VTOL rotor 20. Although this flow describes heat generation and cooling of electrical components of one VTOL rotor 20 representing the eight VTOL rotors 20, heat generation and cooling of the electrical components of the other VTOL rotors 20 can be performed similarly.

At step S12, the control unit 99 receives a thrust request for the VTOL rotor 20 from the pilot of the aircraft 100 via the interface 99a.

At step S14, the control unit 99 determines whether the thrust generated by the VTOL rotor 20 is lower than the thrust request received at step S12. The thrust of the VTOL rotor 20 can be decided by the rotation number and the pitch of the one or more blades 23. When the thrust of the VTOL rotor 20 is smaller than the thrust request, the flow proceeds to step S16, and when it is larger, the flow proceeds to step S32.

Note that, instead of determining based on the thrust of the VTOL rotor 20, the flow may be branched based on determining which of the VTOL rotor 20 and the cruising rotor 29 to run. For example, in a case where the VTOL rotor 20 is fully run, such as during vertical take-off and landing, the flow may proceed to step S16 to run the cooling system 60, and in a case where the cruising rotor 29 is run and the VTOL rotor 20 is stopped or not fully run, such as during cruise, the flow may proceed to step S32 to temporarily run the motor 21 and the inverter 22 to cause heat generation thereof.

At step S16, the control unit 99 controls the ECU 25 to increase power of the motor 21 by increasing the rotation number and/or the rotational torque of the motor 21. In this manner, the rotation number of the one or more blades 23 is increased.

At step S18, the control unit 99 controls the thrust generated by rotation of the one or more blades 23 by controlling the actuator 24a via the variable pitch mechanism 24 to adjust the pitch of the one or more blades 23. For example, in a case where the thrust of the VTOL rotor 20 is larger than the thrust request, the thrust is suppressed by reducing the pitch (to be closer to the plane of rotation) of the one or more blades 23 by the variable pitch mechanism 24. In a case where the thrust of the VTOL rotor 20 is smaller than the thrust request, the thrust is enhanced by increasing the pitch (to be away from the plane of rotation) of the one or more blades 23 by the variable pitch mechanism 24.

At step S20, the control unit 99 detects the temperature (rotor temperature of the electrical components of the VTOL rotor 20 by the detection unit 80, and determines whether the detected rotor temperature is higher than a predetermined reference temperature. The temperature of either one of the motor 21 and the inverter 22 may be given as the rotor temperature, or the higher one of those temperatures may be given as the rotor temperature.

When the rotor temperature is high, the flow proceeds to step S22 to run the cooling system 60. Note that, the control unit 99 may increase the cooling efficiency of the radiator 61 by increasing the running amount of the pump 62 of the cooling system 60 to increase the flow capacity of the coolant fluid of the radiator 61 or to increase the rotation number of the fan 61e. In this manner, the electrical components of the VTOL rotor 20 are cooled. After running the cooling system 60, the flow returns to step S12.

When the rotor temperature is low, the flow proceeds to step S24 to stop the cooling system 60. Here, the control unit 99 may stop the radiator 61 or the pump 62 included in the cooling system 60 or both, or may stop the cooling function by closing, with the shutter $70a_O$, the inlet 70a provided on the upper side of the boom 18 for introducing airflow to the radiator 61. In addition, the cooling efficiency of the radiator 61 may be lowered by decreasing the running amount of the pump 62 of the cooling system 60 to reduce the flow capacity of the coolant fluid of the radiator 61 or to reduce the rotation number of the fan 61e. After stopping the cooling system 60, the flow returns to step S12.

Note that, in a case where the rotor temperature is as low as nearly the lower limit of the operation guarantee temperature of the electrical components of the VTOL rotor 20, heat retention of the electrical components of the VTOL rotor 20 may be attempted by running the pump 62 while stopping the fan 61e of the cooling system 60 or closing the inlet 70a with the shutter $70a_O$ to stop the cooling function.

At step S32, the control unit 99 detects the temperature (rotor temperature) of the electrical components of the VTOL rotor 20 by the detection unit 80, and determines whether the detected rotor temperature is higher than a predetermined reference temperature. The temperature of either one of the motor 21 and the inverter 22 may be given as the rotor temperature, or the higher one of those temperatures may be given as the rotor temperature.

When the rotor temperature is high, the flow proceeds to step S34 to run the cooling system 60. Similarly to step S22, the control unit 99 may increase the cooling efficiency of the radiator 61 by increasing the running amount of the pump 62 of the cooling system 60 to increase the flow capacity of the coolant fluid of the radiator 61 or to increase the rotation number of the fan 61e. In this manner, the electrical components of the VTOL rotor 20 are cooled. After running the cooling system 60, the flow proceeds to step S38.

When the rotor temperature is low, the flow proceeds to step S36 to stop the cooling system 60. Similarly to step S24, the control unit 99 may stop the radiator 61 or the pump 62 included in the cooling system 60 or both, or may stop the cooling function by closing, with the shutter $70a_O$, the inlet 70a provided on the upper side of the boom 18 for introducing airflow to the radiator 61. In addition, the cooling efficiency of the radiator 61 may be lowered by decreasing the running amount of the pump 62 of the cooling system 60 to reduce the flow capacity of the coolant fluid of the radiator 61 or to reduce the rotation number of the fan 61e. In this manner, over-cooling of the motor 21 and the inverter 22 can be prevented. After stopping the cooling system 60, the flow proceeds to step S38.

Note that, in a case where the rotor temperature is as low as nearly the lower limit of the operation guarantee temperature of the electrical components of the VTOL rotor 20, heat retention of the electrical components of the VTOL rotor 20 may be attempted by running the pump 62 while stopping the fan 61e of the cooling system 60 or closing the inlet 70a with the shutter $70a_O$ to stop the cooling function.

At step S38, the control unit 99 detects the temperature (motor temperature) of the motor 21 of the VTOL rotor 20 by the detection unit 80, and determines whether the detected motor temperature is higher than a predetermined reference temperature. When the motor temperature is low, the flow proceeds to step S40, and when the motor temperature is high, the flow proceeds to step S42.

At step S40, the control unit 99 enhances the power of the motor 21. Here, the control unit 99 enhances the frequency of the AC power applied to the three-phase coil of the motor 21 to increase the rotation number of the motor 21 by sending a driving signal from the ECU 25 to the inverter 22. In addition, the control unit 99 increases the amplitude (that is, the voltage amplitude) of the AC power applied to the three-phase coil of the motor 21 to increase the rotational torque of the motor 21. An amount of heat corresponding to the power of the motor 21 is generated by running the motor 21 with increased power (which is equal to the product of the rotation number and the rotational torque) by one or both of the above. After running the motor 21, the flow proceeds to step S44.

At step S42, the control unit 99 decreases the power of the motor 21. Here, the control unit 99 decreases the frequency of the AC power applied to the three-phase coil of the motor 21 to decrease the rotation number of the motor 21 by sending a driving signal from the ECU 25 to the inverter 22. In addition, the control unit 99 reduces the amplitude (that is, the voltage amplitude) of the AC power applied to the three-phase coil of the motor 21 to reduce the rotational torque of the motor 21. The amount of heat generation of the motor 21 is suppressed by running the motor 21 with decreased power (which is equal to the product of the rotation number and the rotational torque) by one or both of the above. After running the motor 21, the flow proceeds to step S44.

At step S44, the control unit 99 controls the thrust generated by rotation of the one or more blades 23 by controlling the actuator 24a via the variable pitch mechanism 24 to adjust the pitch of the one or more blades 23. For example, in a case where the thrust of the VTOL rotor 20 becomes larger than the thrust request due to enhancing of the rotation number of the motor 21 at step S40, the thrust is suppressed by reducing the pitch (to be closer to the plane of rotation) of the one or more blades 23 by the variable pitch mechanism 24. In a case where the thrust of the VTOL rotor 20 becomes smaller than the thrust request due to decreasing of the rotation number of the motor 21 at step S42, for example, the thrust is enhanced by increasing the pitch (to be away from the plane of rotation) of the one or more blades 23 by the variable pitch mechanism 24.

Note that, the motor 21 may be run by increasing the pitch of the blade 23 in order to reducing the rotation number of the motor 21 and increase the rotational torque to reduce the noise of the VTOL rotor 20. In order to lower the motor temperature in such a case, heat generation may be suppressed by enhancing the running efficiency of the motor 21 while maintaining the thrust by decreasing the rotation number of the motor 21 at step S42 and increasing the pitch of the blade 23 at S44. In addition, in order to increase the temperature of the motor, the amount of heat generation of the motor may be increased by lowering the running efficiency of the motor 21 by increasing the rotation number of the motor 21 at step S40 and reducing the pitch of the blade 23 at step S44.

At step S46, the control unit 99 detects the temperature (inverter temperature) of the inverter 22 of the VTOL rotor 20 by the detection unit 80, and determines whether the detected inverter temperature is higher than a predetermined reference temperature. When the inverter temperature is low, the flow proceeds to step S48, and when the motor temperature is high, the flow proceeds to step S52.

At step S48, the control unit 99 increases the power loss (inverter loss) of the inverter 22. Here, the control unit 99 causes the inverter 22 to generate heat by increasing the current amount flowing through the switching device of the inverter 22 to increase power loss of the inverter 22.

At step S50, the control unit 99 lowers the power conversion efficiency of the inverter 22. Here, the control unit 99 modulates the phase of the AC power applied to the three-phase coil of the motor 21 to lower DC and AC power conversion efficiency by controlling driving timing of the switching device of the inverter 22 via the ECU 25, thereby increasing power loss of the inverter 22 to increase the amount of heat generation.

Note that, only one of step S48 or step S50 may be performed.

At step S52, the control unit 99 decreases the power loss (inverter loss) of the inverter 22. Here, the control unit 99 suppresses heat generation of the inverter 22 by decreasing the current amount flowing through the switching device of the inverter 22 to decrease power loss of the inverter 22.

At step S54, the control unit 99 increases the power conversion efficiency of the inverter 22. Here, the control unit 99 modulates the phase of the AC power applied to the three-phase coil of the motor 21 to increase DC and AC power conversion efficiency by controlling driving timing of the switching device of the inverter 22 via the ECU 25, thereby suppressing power loss of the inverter 22 to suppress the amount of heat generation.

Note that, only one of step S52 or step S54 may be performed.

Further, the control unit 99 detects the temperature of the coolant fluid of the radiator 61 and/or the pump 62 by the temperature sensor 66, and when the detected temperature is lower than a predetermined reference temperature, may run the heat generation unit 90, that is, increase the power of the motor 21 similarly to step S40 and/or increase the inverter loss similarly to step S48 to cause heat generation thereof and to heat the coolant fluid. In this manner, freezing of the coolant fluid can be prevented.

Once steps S46 to S52 has ended, the flow returns to step S12.

As described above, a thrust request for the VTOL rotor 20 is received and the temperature of the motor 21 and the inverter 22 of the VTOL rotor 20 stored within the boom 18 is detected, and by running the motor 21 and the inverter 22 based on the thrust request and the detection result of the temperature to cause heat generation, freezing thereof can be prevented without using a heating apparatus.

Figure 5:
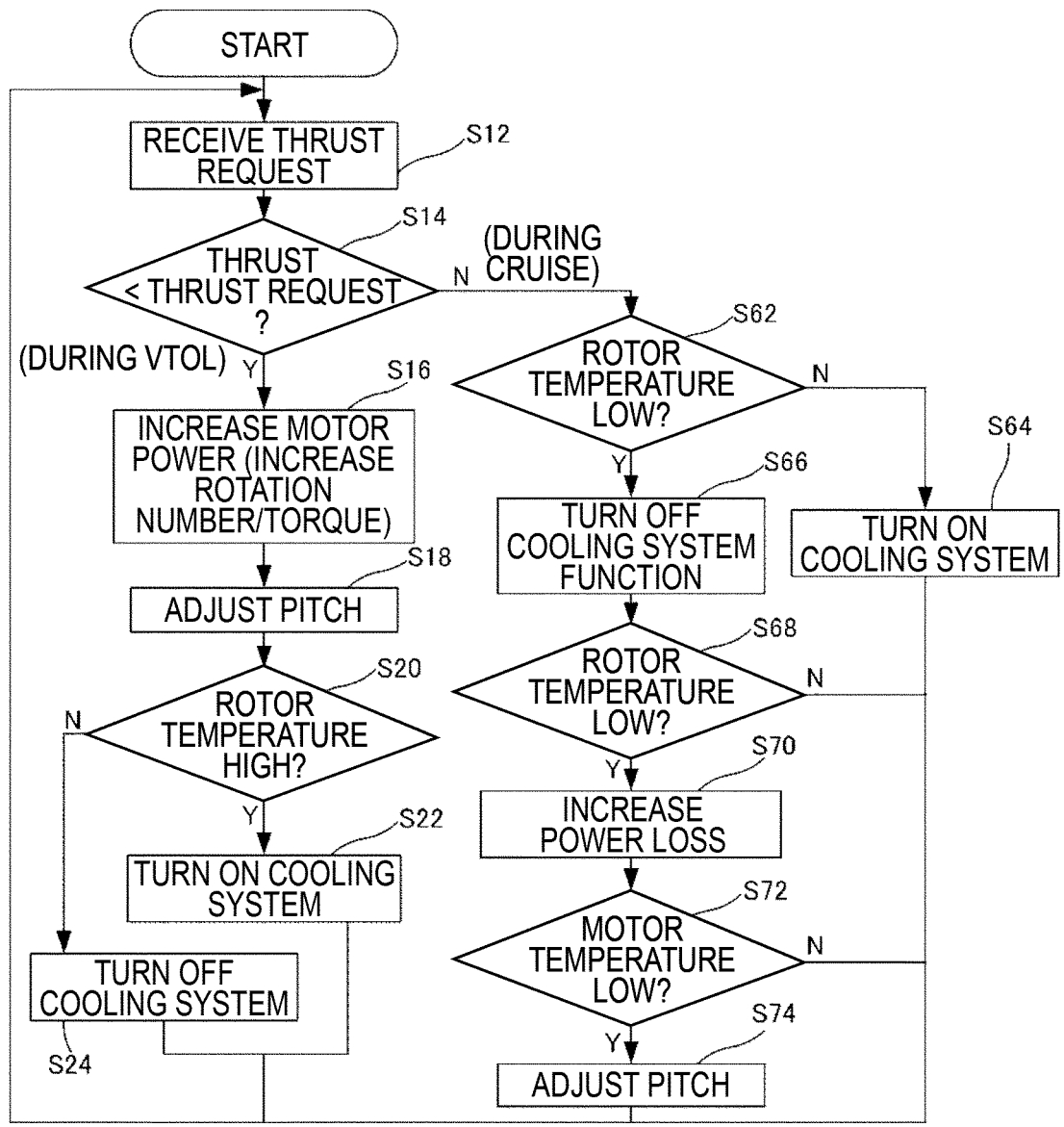
FIG. 5 illustrates another flow of a heat generation and cooling method of the electrical components of the VTOL rotor.

FIG. 5 illustrates another flow S110 of a heat generation and cooling method of the electrical components of the VTOL rotor 20. Although this flow describes heat generation and cooling of electrical components of one VTOL rotor 20 representing the eight VTOL rotors 20, heat generation and cooling of the electrical components of the other VTOL rotors 20 can be performed similarly. Steps S12 to S24 in this flow is similar to those in the flow S100 described above. At step S14, when the control unit 99 determines that the thrust generated by the VTOL rotor 20 is not lower than the thrust request received at step S12, the flow proceeds to step S62.

At step S62, the control unit 99 detects the temperature of the electrical components of the VTOL rotor 20 (the temperature of the motor 21 and/or the inverter 22) by the detection unit 80, detects the temperature of the coolant fluid of the radiator 61 and/or the pump 62 by the temperature sensor 66, and determines whether the detected temperature of at least one of the motor 21 or the like (referred to as the rotor temperature) is lower than a predetermined reference temperature. When the rotor temperature is high, the flow proceeds to step S64 to run the cooling system 60. Details are similar to step S22 described above. After running the cooling system 60, the flow returns to step S12. When the rotor temperature is low, the flow proceeds to step S66.

At step S66, the cooling function of the cooling system 60 is stopped. Here, the control unit 99 runs the pump 62 to retain heat of the electrical components of the VTOL rotor 20 while stopping the cooling function by stopping the fan 61e of the cooling system 60 and/or closing the inlet 70a with the shutter 70$a_0$.

At step S68, again, the control unit 99 detects the rotor temperature, and determines whether this is lower than the predetermined reference temperature. When the rotor temperature is high, it is determined that heat of the electrical component VTOL rotor 20 has been retained by step S66, and the flow returns to step S12. When the rotor temperature is still low, the flow proceeds to step S70.

At step S70, the control unit 99 controls driving timing of the switching device of the inverter 22 via the ECU 25 to send DC power to the motor 21 via the inverter 22, thereby increasing power loss of the motor 21 and the inverter 22 and causing heat generation thereof without causing the motor 21 to rotate. Note that, the control unit 99 can adjust power loss of the motor 21 and the inverter 22, that is, the amount of heat generation by increasing and decreasing the current amount of the DC power.

At step S72, again, the control unit 99 detects the rotor temperature, determines whether the temperature of the motor 21, coolant fluid of the radiator 61, and/or the pump 62 (referred to as the motor 61 or the like) is still lower than the predetermined reference temperature inspite of the temperature of the inverter 22 becoming high. When the temperature of the motor 61 or the like is high, it is determined that heat of the electrical component VTOL rotor 20 has been retained by step S68, and the flow returns to step S12. When the temperature of the motor 61 or the like is still low, the flow proceeds to step S74.

At step S74, the control unit 99 suppresses the thrust by controlling the actuator 24a via the variable pitch mechanism 24 to reduce the pitch of the one or more blades 23 (to be closer to the plane of rotation), and controls driving timing of the switching device of the inverter 22 via the ECU 25 to send the AC power to the motor 21, thereby causing the motor 21 to rotate. In this manner, heat generation of the inverter 21 is mitigated and the motor 21 is caused to generate heat. Once step S74 has ended, the flow returns to step S12.

Note that, at step S68, a different process may be performed by setting a plurality of reference temperatures. For example, the flow proceeds to step S70 in a case where the rotor temperature is lower than a first reference temperature which is relatively high, and increases the power loss of the motor 21 and the inverter 22 to cause heat generation thereof without causing the motor 21 to rotate. The flow skips steps S70 to S72 and proceeds to step S74 in a case where the rotor temperature is lower than a second reference temperature which is relatively low, and increases the power loss of the motor 21 and the inverter 22 to cause heat generation thereof while causing the motor 21 to rotate. In this manner, freezing protection can be swiftly performed in a case where the rotor temperature is extremely low (for example, −10 to 0° C.) due to freezing rain or fog.

As described above, a thrust request for the VTOL rotor 20 is received and the temperature of the motor 21 and the inverter 22 of the VTOL rotor 20 stored within the boom 18 is detected, and by running the motor 21 and the inverter 22 based on the thrust request and the detection result of the temperature to cause heat generation, freezing thereof can be prevented without using a heating apparatus.

The aircraft 100 according to the present embodiment includes a fuselage 12, a VTOL rotor 20 including one or more blades 23 that is supported on the boom 18 to be spaced apart from the fuselage 12 for generating thrust during take-off and landing, a motor 21 that is stored in the boom 18 and is configured to cause the one or more blades 23 to rotate, and an inverter 22 for controlling the motor 21, a detection unit 80 configured to detect a temperature of at least one apparatus of the motor 21 or the inverter 22, and a control unit 99 configured to run the at least one apparatus based on a thrust request for a plurality of VTOL rotors 20 and a detection result of the temperature. Accordingly, by detecting a temperature of at least one apparatus of the motor 21 or the inverter 22 stored within the boom 18 that is spaced apart from the fuselage 12 by the detection unit 80 and running the at least one apparatus to cause heat generation thereof based on the thrust request for the VTOL rotor 20 and a detection result of the temperature by the control unit 99, freezing thereof can be prevented without using a heating apparatus.

The heat generation method of electrical components of the VTOL rotor 20 according to the present embodiment includes receiving a thrust request for a VTOL rotor 20 including one or more blades 23 that is supported on the boom 18 to be spaced apart from the fuselage 12 for generating thrust during take-off and landing, a motor 21 that is stored in the boom 18 and is configured to cause the one or more blades 23 to rotate, and an inverter 22 for controlling the motor 21, detecting a temperature of at least one apparatus of the motor 21 or the inverter 22, and running the at least one apparatus based on a thrust request and a detection result of the temperature. Accordingly, by receiving a thrust request for the VTOL rotor 20, detecting a temperature of at least one apparatus of the motor 21 or the inverter 22 stored within the boom 18 that is spaced apart from the fuselage 12 and running the at least one apparatus to cause heat generation thereof based on the thrust request and a detection result of the temperature, freezing thereof can be prevented without using a heating apparatus.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An aircraft comprising:
   a fuselage;
   a rotor including one or more blades that is supported on a support member spaced apart from the fuselage, for generating thrust in a vertical direction during take-off and landing, and a rotational apparatus stored in the support member for causing the one or more blades to rotate and a control apparatus configured to control the rotational apparatus;
   a detection unit configured to detect a temperature of at least one apparatus of the rotational apparatus or the control apparatus; and
   a control unit configured to run the at least one apparatus based on a thrust request for the rotor and a detection result of the temperature, wherein
   i) the detection unit is configured to detect the temperature of the rotational apparatus, and
   the control unit is configured to increase an amount of heat generation of the rotational apparatus by enhancing a power of the rotational apparatus or by lowering a running efficiency of the rotational apparatus when the detected temperature of the rotational apparatus is lower than a predetermined reference temperature, or
   ii) the detection unit is configured to detect the temperature of the control apparatus, and
   the control unit is configured to ii) increase an amount of heat generation of the control apparatus by increasing a power loss of the control apparatus when the detected temperature of the control apparatus is lower than a predetermined reference temperature.

2. The aircraft according to claim 1, wherein the control unit is configured to control at least one of a rotation number or rotational torque of the rotational apparatus.

3. The aircraft according to claim 2, wherein
   the rotor further includes an actuator configured to adjust a pitch of the one or more blades, and
   the control unit is further configured to control thrust generated by rotation of the one or more blades by running the actuator to adjust a pitch of the one or more blades.

4. The aircraft according to claim 1, wherein the control unit is configured to control current amount that flows through a switching device of the control apparatus.

5. The aircraft according to claim 2, wherein the control unit is configured to control current amount that flows through a switching device of the control apparatus.

6. The aircraft according to claim 3, wherein the control unit is configured to control current amount that flows through a switching device of the control apparatus.

7. The aircraft according to claim 1, wherein the control unit is configured to control driving timing of a switching device of the control apparatus to adjust power conversion efficiency.

8. The aircraft according to claim 2, wherein the control unit is configured to control driving timing of a switching device of the control apparatus to adjust power conversion efficiency.

9. The aircraft according to claim 3, wherein the control unit is configured to control driving timing of a switching device of the control apparatus to adjust power conversion efficiency.

10. The aircraft according to claim 1, further comprising a cooling apparatus configured to cool the at least one apparatus, wherein
the control unit is configured to stop the cooling apparatus based on a detection result by the detection unit.

11. The aircraft according to claim 2, further comprising a cooling apparatus configured to cool the at least one apparatus, wherein
the control unit is configured to stop the cooling apparatus based on a detection result by the detection unit.

12. The aircraft according to claim 3, further comprising a cooling apparatus configured to cool the at least one apparatus, wherein
the control unit is configured to stop the cooling apparatus based on a detection result by the detection unit.

13. The aircraft according to claim 10, wherein the control unit is configured to stop a radiator or a pump of the cooling apparatus.

14. The aircraft according to claim 10, wherein the control unit is configured to close an inlet for introducing airflow to a radiator of the cooling apparatus.

15. The aircraft according to claim 13, wherein the control unit is configured to close an inlet for introducing airflow to a radiator of the cooling apparatus.

16. The aircraft according to claim 1, further comprising:
a cooling apparatus for cooling at least one apparatus of the rotational apparatus or the control apparatus; and
a cruising rotor that is provided at a rear end of the fuselage, the cruising rotor including one or more blades for generating thrust during cruise, wherein
the control unit is configured to run the cooling apparatus when the rotor is running, and to run at least one of the rotational apparatus or the control apparatus to cause heat generation thereof when the cruising rotor is running.

17. The aircraft according to claim 2, further comprising:
a cooling apparatus for cooling at least one apparatus of the rotational apparatus or the control apparatus; and
a cruising rotor that is provided at a rear end of the fuselage, the cruising rotor including one or more blades for generating thrust during cruise, wherein
the control unit is configured to run the cooling apparatus when the rotor is running, and to run at least one of the rotational apparatus or the control apparatus to cause heat generation thereof when the cruising rotor is running.

18. The aircraft according to claim 1, further comprising a wing body that extends laterally from the fuselage, the wing body being configured to generate lift during cruise, wherein
the support member is supported by the wing body to be spaced apart from the fuselage.

19. The aircraft according to claim 2, further comprising a wing body that extends laterally from the fuselage, the wing body being configured to generate lift during cruise, wherein
the support member is supported by the wing body to be spaced apart from the fuselage.

20. A method comprising:
receiving a thrust request for a rotor including one or more blades that is supported on a support member that is spaced apart from a fuselage, the one or more blades being configured to generate thrust in a vertical direction during take-off and landing, and a rotational apparatus stored in the support member for causing rotation of the one or more blades and an a control apparatus for controlling the rotational apparatus;
detecting a temperature of at least one apparatus of the rotational apparatus or the control apparatus; and
running the at least one apparatus based on the thrust request and a detection result of the temperature, wherein
i) the detecting the temperature includes detecting the temperature of the rotational apparatus, and
the running the at least one apparatus includes increasing an amount of heat generation of the rotational apparatus by enhancing a power of the rotational apparatus or by lowering a running efficiency of the rotational apparatus when the detected temperature of the rotational apparatus is lower than a predetermined reference temperature, or
ii) the detecting the temperature includes detecting the temperature of the control apparatus, and
the running the at least one apparatus includes ii) increasing an amount of heat generation of the control apparatus by increasing a power loss of the control apparatus when the detected temperature of the control apparatus is lower than a predetermined reference temperature.

21. An aircraft comprising:
a fuselage;
a rotor including one or more blades that is supported on a support member spaced apart from the fuselage, for generating thrust in a vertical direction during take-off and landing, and a rotational apparatus stored in the support member for causing the one or more blades to rotate and a control apparatus configured to control the rotational apparatus;
a detection unit configured to detect a temperature of the rotational apparatus and the control apparatus; and
a control unit configured to i) increase an amount of heat generation of the rotational apparatus by enhancing a power of the rotational apparatus or by lowering a running efficiency of the rotational apparatus when the detected temperature of the rotational apparatus is lower than a predetermined reference temperature, and
ii) increase an amount of heat generation of the control apparatus by increasing a power loss of the control apparatus when the detected temperature of the control apparatus is lower than a predetermined reference temperature.

22. The aircraft according to claim 1, wherein
the control unit is configured to increase current amount that flows through a switching device of the control apparatus.

23. The aircraft according to claim 1, wherein
the control unit is configured to control driving timing of a switching device of the control apparatus to lower power conversion efficiency.

* * * * *